(12) United States Patent
Chen

(10) Patent No.: US 10,825,368 B2
(45) Date of Patent: Nov. 3, 2020

(54) IMAGE DISPLAY DEVICE AND IMAGE DISPLAY METHOD

(71) Applicant: Qisda Corporation, Taoyuan (TW)

(72) Inventor: Wei-Jou Chen, Hsinchu County (TW)

(73) Assignee: Qisda Corporation, Taoyuan (TW)

( * ) Notice: Subject to any disclaimer, the term of this patent is extended or adjusted under 35 U.S.C. 154(b) by 10 days.

(21) Appl. No.: 16/172,969

(22) Filed: Oct. 29, 2018

(65) Prior Publication Data

US 2019/0172378 A1 Jun. 6, 2019

(30) Foreign Application Priority Data

Dec. 6, 2017 (CN) .......................... 2017 1 1273966

(51) Int. Cl.
| | | |
|---|---|---|
| G09G 3/00 | (2006.01) | |
| G06F 3/01 | (2006.01) | |
| G09G 5/00 | (2006.01) | |
| G06F 3/0481 | (2013.01) | |
| G02B 30/27 | (2020.01) | |

(52) U.S. Cl.
CPC ............ *G09G 3/003* (2013.01); *G02B 30/27* (2020.01); *G06F 3/013* (2013.01); *G06F 3/04815* (2013.01); *G09G 5/003* (2013.01); *G09G 2300/023* (2013.01); *G09G 2354/00* (2013.01)

(58) Field of Classification Search
CPC ..... G09G 5/14; G09G 5/16; G09G 2320/0309
See application file for complete search history.

(56) References Cited

U.S. PATENT DOCUMENTS

| | | | | |
|---|---|---|---|---|
| 9,035,968 B2* | 5/2015 | Zomet | ................ | G02B 27/2214 345/100 |
| 9,188,788 B2* | 11/2015 | Kim | .................... | G02B 27/2214 |
| 9,529,205 B2* | 12/2016 | Orimoto | ............ | G02B 27/2214 |
| 10,025,110 B2* | 7/2018 | Chung | ................. | H04N 13/305 |
| 2005/0083516 A1* | 4/2005 | Baker | ................. | G02B 27/225 356/124 |
| 2007/0132662 A1* | 6/2007 | Morita | .................. | G06T 19/006 345/8 |
| 2009/0110291 A1* | 4/2009 | Matsumura | ............ | G06T 7/215 382/195 |
| 2010/0220178 A1* | 9/2010 | Takahashi | .............. | H04N 13/10 348/54 |
| 2011/0032252 A1* | 2/2011 | Ohta | ...................... | G09G 3/003 345/419 |

(Continued)

FOREIGN PATENT DOCUMENTS

CN 104407439 A 3/2015

OTHER PUBLICATIONS

Office action of counterpart application by China IP Office dated Apr. 11, 2019.

*Primary Examiner* — William Lu

(57) ABSTRACT

An image display device including a transparent panel and a display adjustment layer is provided. The transparent panel displays a superimposed image corresponding to a surface region at a first region. The display adjustment layer is on the transparent panel for reserving a monocular vision to see the superimposed image. When a first eye and a second eye see the surface region through the image display device, the first eye sees the superimposed image superimposed on the surface region but the second eye only sees the surface region.

16 Claims, 5 Drawing Sheets

(56) References Cited

U.S. PATENT DOCUMENTS

| | | | |
|---|---|---|---|
| 2011/0050864 A1* | 3/2011 | Bond | G06T 7/579 348/51 |
| 2011/0069153 A1* | 3/2011 | Nakane | H04N 19/597 348/43 |
| 2011/0221866 A1* | 9/2011 | Ohta | G06F 1/1637 348/46 |
| 2011/0254837 A1* | 10/2011 | Kang | H04N 13/156 345/419 |
| 2011/0304530 A1* | 12/2011 | Yeh | G02B 27/2264 345/156 |
| 2011/0304708 A1* | 12/2011 | Ignatov | H04N 13/128 348/51 |
| 2012/0019528 A1* | 1/2012 | Ugawa | H04N 13/239 345/419 |
| 2012/0133645 A1* | 5/2012 | Jung | H04N 13/128 345/419 |
| 2012/0176409 A1* | 7/2012 | Noge | A63F 13/213 345/633 |
| 2012/0257018 A1* | 10/2012 | Shigemura | G02B 27/2214 348/46 |
| 2012/0306738 A1* | 12/2012 | Yamashita | G06F 3/0482 345/156 |
| 2013/0050452 A1* | 2/2013 | Ramsey | H04N 13/307 348/58 |
| 2013/0182078 A1* | 7/2013 | Kitaura | H04N 13/30 348/46 |
| 2013/0194385 A1* | 8/2013 | Noguchi | H04N 13/106 348/43 |
| 2013/0251241 A1* | 9/2013 | Kunkel | G06K 9/00201 382/154 |
| 2014/0028670 A1* | 1/2014 | Tsurumi | G09G 5/14 345/419 |
| 2014/0063083 A1* | 3/2014 | Hamagishi | G09G 3/003 345/694 |
| 2014/0078194 A1* | 3/2014 | An | G09G 3/003 345/691 |
| 2014/0139646 A1* | 5/2014 | Lee | H04N 21/4122 348/51 |
| 2015/0009304 A1* | 1/2015 | Linge | H04N 13/302 348/51 |
| 2015/0381959 A1* | 12/2015 | Lee | H04N 13/398 382/154 |
| 2016/0065950 A1* | 3/2016 | Quan | G09G 3/003 348/51 |
| 2016/0270656 A1* | 9/2016 | Samec | A61B 5/6803 |
| 2017/0230642 A1* | 8/2017 | Suzuki | H04N 13/373 |
| 2018/0084245 A1* | 3/2018 | Lapstun | G02B 27/0075 |
| 2018/0205942 A1* | 7/2018 | Smith | G02B 27/2214 |
| 2019/0243527 A1* | 8/2019 | Kuribayashi | G06F 3/0482 |

* cited by examiner

IMAGE DISPLAY DEVICE AND IMAGE DISPLAY METHOD

This application claims the benefit of People's Republic of China application Serial No. 201711273966.2, filed Dec. 6, 2017, the subject matter of which is incorporated herein by reference.

BACKGROUND OF THE INVENTION

Field of the Invention

The invention relates in general to an image display device and an image display method, and more particularly to an image display device used in image superimposing and an image display method thereof.

Description of the Related Art

Conventionally, before a doctor performs surgery, he/she will normally evaluate the position, depth and direction of the surgical position through the assistance of medical images such as magnetic resonance imaging (MRI), computed tomography, and X-ray image.

However, the medical images are displayed on an independent display, and doctors only use his/her imagination to superimpose the medical images and the physical object. Thus, medical images do not provide accurate guidance to doctors during surgery.

Therefore, how to provide an image display device and an image display method capable of superimposing images displayed on the display panel and the physical object has become a prominent task for the industries.

SUMMARY OF THE INVENTION

According to one embodiment of the present disclosure, an image display device including a transparent panel and a display adjustment layer is provided. The transparent panel displays a superimposed image corresponding to a surface region at a first region. The display adjustment layer is formed on the transparent panel for reserving a monocular vision to see the superimposed image. When a first eye and a second eye see the surface region through the image display device, the first eye sees the superimposed image superimposed on the surface region and the second eye only sees the surface region.

According to another embodiment of the present disclosure, an image display method is provided. The image display method includes: displaying a superimposed image corresponding to a surface region at a first region of a transparent panel; forming a display adjustment layer on the transparent panel; and providing a monocular vision to see the superimposed image, wherein when a first eye and a second eye see the surface region through the display adjustment layer and the transparent panel, the first eye sees the superimposed image superimposed on the surface region but the second eye only sees the surface region.

To summarize, the image display device and the image display method disclosed in the embodiments of the invention may directly superimpose the image displayed on the transparent panel and the image of a physical object. This is for resolving the parallax problem arising when human eyes view the superimposed image by removing the image display circuits from the display region or switching the display region. Further, the embodiments of the application may achieve vision depth to human eyes when viewing the superimposed image.

The above and other contents of the invention will become better understood with regard to the following detailed description of the preferred but non-limiting embodiment(s). The following description is made with reference to the accompanying drawings.

DETAILED DESCRIPTION OF THE INVENTION

The specification is described below with a number of exemplary embodiments and accompanying drawings. However, the disclosed embodiments are not for limiting the scope of protection of the invention, the descriptions of the operations of the structure are not for limiting the order of implementation, and any devices which are formed of any combinations of the elements and produce equivalent effects are still within the scope of protection of the invention. Moreover, the dimension scales used in the accompanying drawings are not based on actual proportions of the elements. For the descriptions to be easily understood, designations common to the accompanying drawings are used to indicate identical or similar elements.

Moreover, ordinal numbers, such as "the first", "the second", . . . are not used to specify particular order or sequence or limit the invention, but are merely used to differentiate the elements or operations described using the same terminologies.

Figure 1:
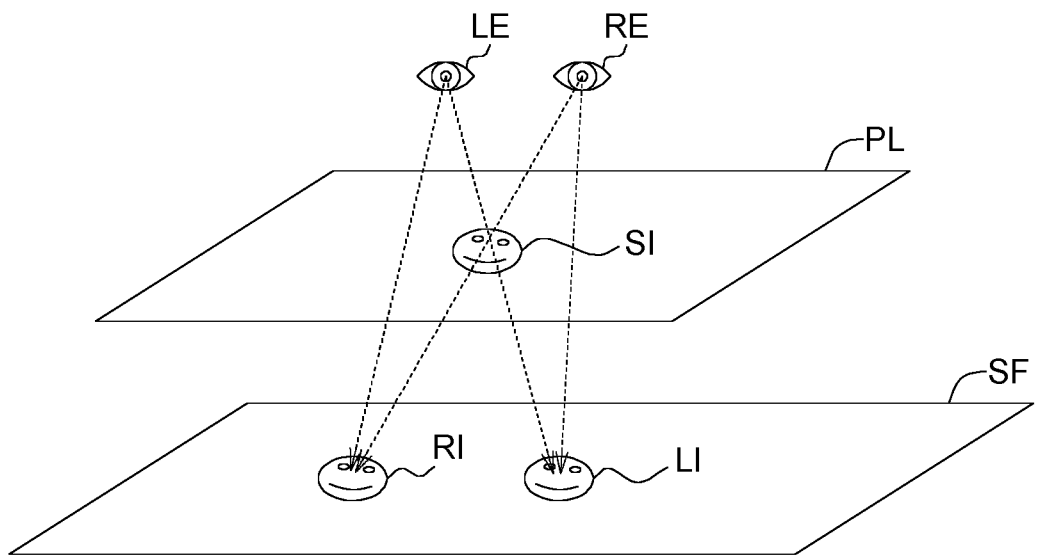
FIG. 1 (prior art) shows conventional image superimposing.

Referring to FIG. 1, conventional image superimposing is shown. As indicated in FIG. 1, magnetic resonance imaging (MRI), computed tomography, X-ray image or other medical image under the surgical area are displayed on a transparent panel PL. For example, when a surface region RI on the affected surface SF needs surgery, the surgical position of the transparent panel PL and the affected surface SF are superimposed. However, due to the parallax between the left eye LE and the right eye RE of a human body (such as a doctor), the doctor's brain will interpret the medical image viewed by the left eye LE through the transparent panel PL as an image at the surface region LI of the affected surface SF and interpret the medical image viewed by the right eye RE through the transparent panel PL as an image at the surface region RI of the affected surface SF. Since the position of the surface region RI and the position of the surface region LI are not the same, the doctor will be confused with the exact position of the affected part. In order to accurately superimpose the medical image displayed on the transparent panel PL and the affected part, the parallax between the left eye LE and the right eye RE of the human body (such as a doctor) when viewing the medical image displayed on the transparent panel PL needs to be resolved, and the vision depth needs to be considered.

The embodiments of the invention are applicable to the medical image as well as other applications requiring visual superimposing (such as displaying a known map on a transparent panel PL and superimposing a known map on a road scene). In the following embodiments, the said medical image is referred as a superimposed image SI displayed on the transparent panel PL, and the physical affected part is referred as a surface region RI.

An image display device and an image display method are disclosed below to resolve the said problems.

Figure 2:
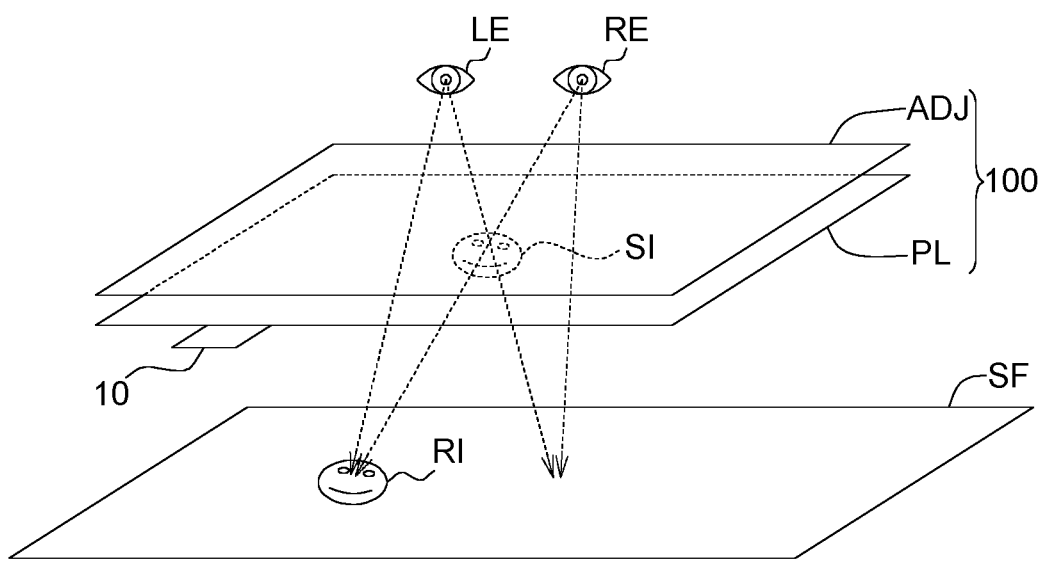
FIG. 2 shows image superimposing according to an embodiment of the invention.

FIG. 2 shows image superimposing according to an embodiment of the invention. As indicated in FIG. 2, the image display device 100 includes a transparent panel PL and a display adjustment layer ADJ. The display adjustment layer ADJ is formed on the transparent panel PL. In an embodiment, the display adjustment layer ADJ may be realized by either a cylindrical lens layer or a parallax shielding layer.

As indicated in FIG. 2, the transparent panel PL displays a superimposed image SI corresponding to a surface region RI (such as an affected part) at a first region, and the display adjustment layer ADJ is formed on the transparent panel PL for reserving a monocular vision to see the superimposed image SI. When the first eye RE and the second eye LE see the surface region RI through the image display device 100, the first eye RE sees the superimposed image SI superimposed on the surface region RI, but the second eye LE sees the surface region RI and will not see the superimposed image SI. Therefore, the viewer will not experience depth error caused by visual displacement arising when both eyes see the superimposed image SI at the same time.

In an embodiment, a scanner 10 is under the transparent panel PL of the image display device 100 for scanning the surface region RI such that the superimposed image SI may correspond to the surface region RI. The said superimposed image SI is a scan image under a depth of the surface region RI. Therefore, the viewer sees the image under the affected surface SF through the image display device 100.

In an embodiment, the superimposed image SI includes an image applicable to the right eye RE and an image applicable to the left eye LE. These images may be two-dimensional (2D) or three-dimensional (3D) image. In case of the images being 2D images, the images applicable to the right eye RE and to the left eye LE may have different distance. In case of the images being 3D images, the images applicable to the right eye RE and to the left eye LE (the image being provided by a three-dimensional camera) may have different visual angles.

In an embodiment, the display adjustment layer ADJ makes the left eye LE only see the first region of the transparent panel PL and the right eye RE only see a second region of the transparent panel PL. The transparent panel PL may selectively display the superimposed image SI at the first region or the second region only, such that only one of the left eye LE or the left eye LE sees the superimposed image SI superimposed on the surface region RI and the other eye only sees the surface region RI.

Figure 3A:
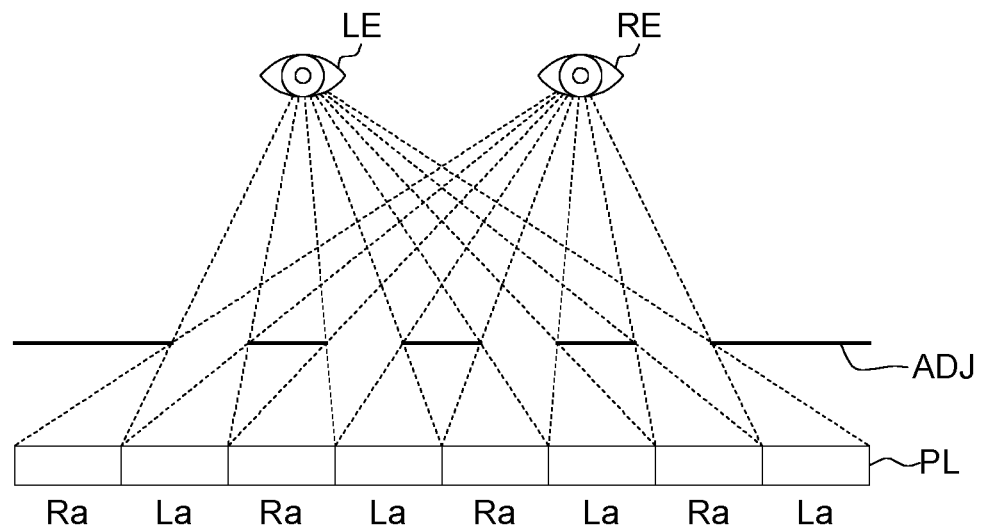
FIGS. 3A~3B are schematic diagrams of a display adjustment layer according to an embodiment of the invention.
Figure 3B:
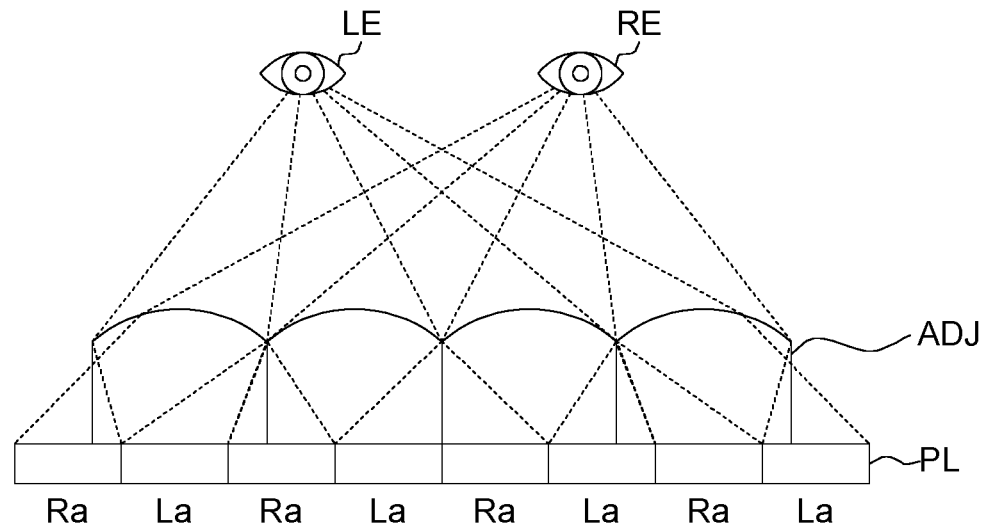

Referring to FIGS. 3A~3B, schematic diagrams of a display adjustment layer according to an embodiment of the invention are shown. As indicated in FIG. 3A, the display adjustment layer ADJ is a parallax shielding layer, the transparent panel PL is divided into a left eye display regions La and a right-eye display regions Ra, which are strip-shaped and staggered with each other (a first region includes a plurality of regions Ra and a second region includes a plurality of regions La). In the present example, the left eye LE only sees the left-eye display regions La of the transparent panel PL and the right eye RE only sees the right-eye display regions Ra of the transparent panel PL. The transparent panel PL displays the superimposed image SI at the left-eye display regions La only. The right eye RE only sees the surface region RI through the right-eye display regions Ra of the transparent panel. Meanwhile, no images are displayed at the display regions Ra. Alternatively, in other possible embodiment, no image display circuits are formed in the display regions Ra such that the display regions Ra may have better transmittance and the display circuit will not interfere with the viewing of the right eye RE.

In an embodiment as indicated in FIG. 3B, the display adjustment layer ADJ is a cylindrical lens layer for adjusting the left-eye display regions La or the right-eye display regions Ra of the transparent panel PL.

As indicated in FIG. 3B, the display adjustment layer ADJ is a parallax shielding layer, and the transparent panel PL is divided into left-eye display regions La and right-eye display regions Ra, which are strip-shaped and staggered with each other. In the present example, the transparent panel PL do not display any images at the right-eye display regions Ra, and when the right eye RE and the left eye LE see the surface region RI through the image display device 100, the left eye LE sees the superimposed image SI superimposed on the surface region RI but the right eye RE only sees the surface region RI (because no images are displayed at the right-eye display regions Ra).

Figure 4:
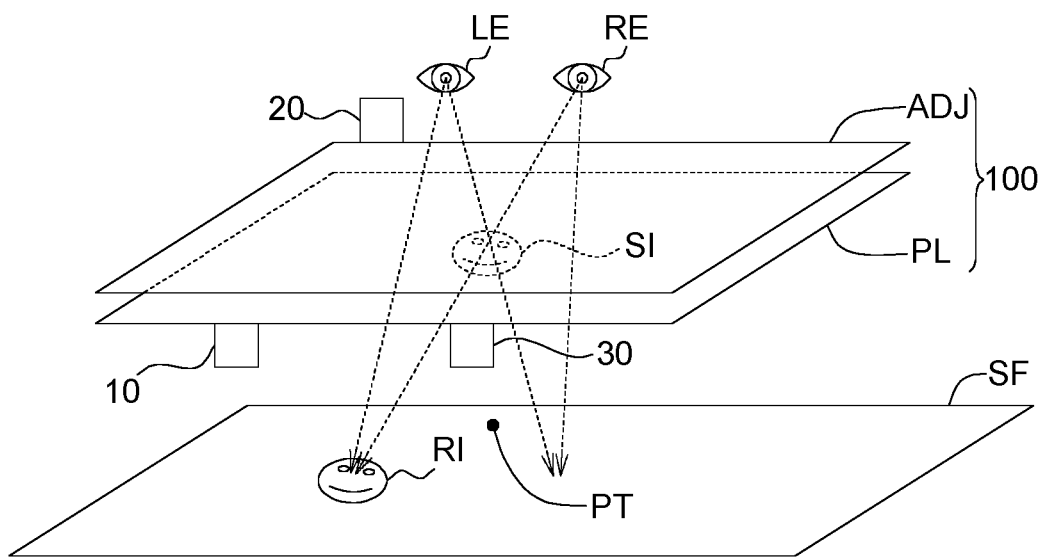
FIG. 4 is a scenario of an image display device 100 according to an embodiment of the invention.

Referring to FIG. 4, a scenario of use of an image display device 100 according to an embodiment of the invention is shown. The image display device 100 further includes an eye tracker 20 above the transparent panel PL for tracking a relative displacement between the first eye (such as the right eye RE) and the transparent panel PL. When the transparent panel PL displays a superimposed image SI at the first region, the eye tracker 20 adjusts the region of the superimposed image SI according to the relative displacement, such that the first eye or the second eye (such as the left eye LE) sees the superimposed image SI superimposed on the surface region RI.

In an embodiment as indicated in FIG. 3A and FIG. 4, the superimposed image SI includes the image applicable to the right eye RE and the image applicable to the left eye LE. When the left-eye display regions La displays the image applicable to the left eye LE but no images are displayed at the right-eye display regions Ra, the left eye LE sees the image (the superimposed image SI) applicable to the left eye LE superimposed on the surface region RI, such that the right eye RE sees the surface region RI through the right-eye display regions Ra. When the eye tracker 20 tracks a relative displacement between the right eye RE (or the left eye LE) and the transparent panel PL, if the relative displacement is larger than a displacement threshold (such as horizontal displacement 2 cm), the situation that the left eye LE and the right eye RE respectively see the left-eye display regions La and the right-eye display regions Ra becomes that the left eye LE only sees the right-eye display regions Ra and the right eye RE only sees the left-eye display regions La. The eye tracker 20 transmits a moving signal to the transparent panel PL, such that the transparent panel PL displays the image applicable to the right eye RE at the left-eye display regions La, but still no images are displayed at the right-eye display regions Ra. Meanwhile, the right eye RE sees the image applicable to the right eye RE (the superimposed image SI) superimposed on the surface region RI, such that the left eye RE only sees the surface region RI through the right-eye display regions Ra. That is, now the eye that sees the superimposed image SI switches to the other eye. In other possible embodiment, no image display circuits are formed in the right-eye display regions Ra, such that the transmittance of the right-eye display regions Ra may be increased.

In an embodiment as indicated in FIG. 3A, the superimposed image SI includes an image applicable to the right eye RE and an image applicable to the left eye LE. When the image applicable to the left eye LE is displayed at the left-eye display regions La but no images are displayed at the right-eye display regions Ra, the left eye LE sees the image applicable to the left eye LE (the superimposed image SI) superimposed on the surface region RI and the right eye RE sees the surface region RI through the right-eye display regions Ra. When the eye tracker 20 detects that the relative displacement between the first eye and the transparent panel PL is larger than a displacement threshold (such as a horizontal displacement of 1 cm), that is, the left-eye display regions La are getting out of the vision of the left eye LE and the right-eye display regions Ra will gradually be seen, the eye tracker 20 transmits a moving signal to the transparent panel PL, such that the transparent panel PL displays the image applicable to the left eye LE at the right-eye display regions Ra. Meanwhile, the left eye LE sees the image applicable to the left eye LE through the right-eye display regions Ra (the superimposed image SI) superimposed on the surface region RI, such that the right eye RE only sees the surface region RI through the left-eye display regions Ra but no images are displayed at the left-eye display regions La.

In an embodiment as indicated in FIG. 4, the image display device 100 further includes a mark tracking device 30 under the transparent panel PL for capturing a positioning point PT at the surface region RI and transmitting a positioning point image to the transparent panel PL. Then, the transparent panel PL calculates a relative displacement between the superimposed image SI and the surface region RI according to the image of the positioning point PT. Thus, the superimposed image SI and the surface region RI may be better positioned.

Figure 5A:
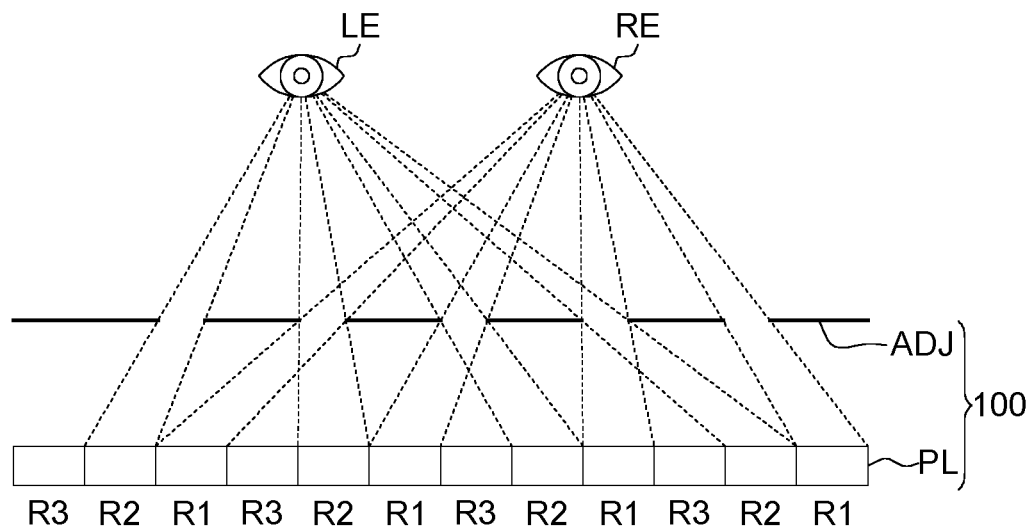
FIG. 5A~5B are schematic diagrams of an image display device according to an embodiment of the invention.
Figure 5B:
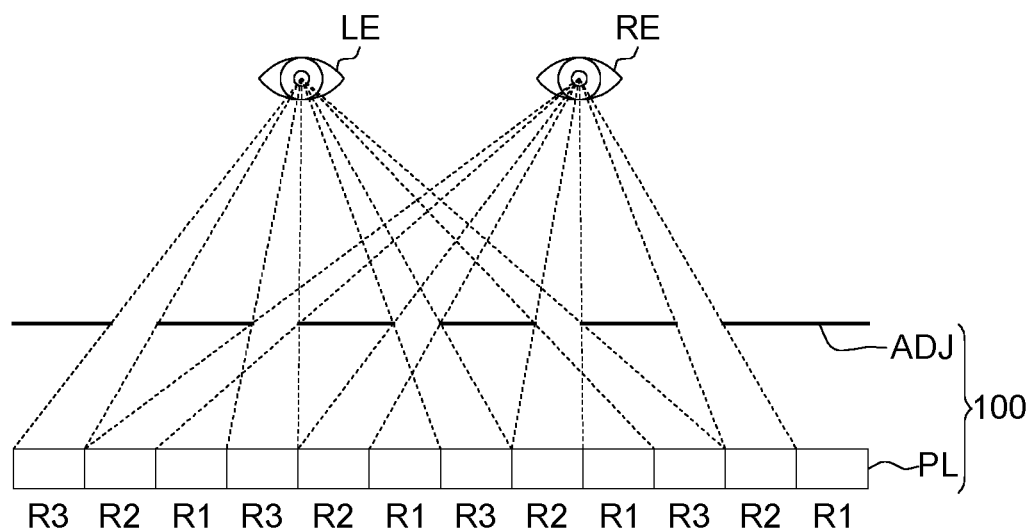

Referring to FIG. 5A~5B, schematic diagrams of an image display device according to an embodiment of the invention are shown. When the display adjustment layer ADJ is a parallax shielding layer, the transparent panel PL includes multiple display regions R1~R3, respectively viewed by the left eye LE or the right eye RE as in different examples. As indicated in FIG. 5A, the right eye RE sees the image applicable to the right eye RE at the display region R1, the left eye LE sees the display region R2, but no images are displayed at the display regions R2 and R3. Referring to FIG. 4, the right eye RE sees the superimposed image SI and the surface region RI, but the left eye LE only sees the surface region RI.

When the eye tracker 20 detects that a relative displacement between the eye RE (or LE) and the transparent panel PL is larger than a threshold A1, the right eye RE sees the display region R2, the left eye LE sees the display region R3 (As indicated in FIG. 5B), and the eye tracker 20 transmits a moving signal to the transparent panel PL, such that the transparent panel PL displays the image applicable to the right eye RE at the display region R2, but no images are displayed at the display region R1 and R3. The right eye RE continues to see the superimposed image SI and the surface region RI, but the left eye LE only sees the surface region RI.

By the same analogy, when the eye tracker 20 detects that a relative displacement between the eye RE (or LE) and the transparent panel PL is larger than a threshold A2, the right eye RE sees the display region R3, the left eye LE sees the display region R1, and the eye tracker 20 transmits a moving signal to the transparent panel PL, such that the transparent panel PL displays the image applicable to the right eye RE at the display region R3, but no images are displayed at the display regions R1 and R2. The right eye RE continues to see the superimposed image SI and the surface region RI, but the left eye LE only sees the surface region RI. Thus, the viewer's viewing will not be interfered with even when his/her head wobbles.

Figure 6:
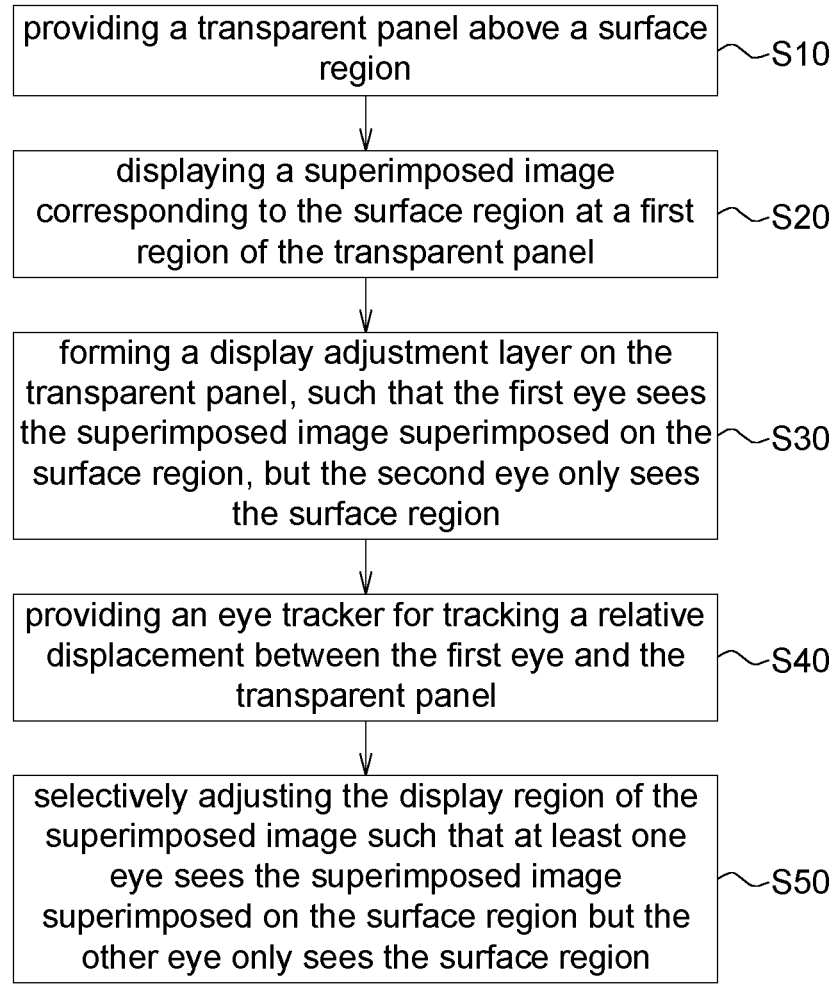
FIG. 6 is a flowchart of a display method for image superimposing according to an embodiment of the invention.

FIG. 6 is a flowchart of a display method for image superimposing according to an embodiment of the invention. The image display method includes following steps. In step S10, a transparent panel is above a surface region. In step S20, the superimposed image corresponding to a surface region under the transparent panel is displayed at the first region of the transparent panel, wherein a scanner may be used to scan a surface region, such that the superimposed image corresponds to the surface region. The said superimposed image is a scan image under a depth of the surface region.

In step S30, a display adjustment layer is on the transparent panel, such that the first eye sees the superimposed image superimposed on the surface region, but the second eye only sees the surface region. The display adjustment layer makes the first eye only see the first region of the transparent panel and the second eye only see the second region of the transparent panel. The transparent panel displays the superimposed image at the first region only. The second eye only sees the surface region through the second region of the transparent panel. Alternatively, no image display circuits are formed in the said second region of the transparent panel. The said display adjustment layer may be realized by either a cylindrical lens layer or a parallax shielding layer.

The first region and the second region both include a plurality of long strip regions, wherein the long strip regions of the first region are staggered with the long strip regions of the second region.

The said superimposed image includes an image applicable to the first eye and an image applicable to the second eye. When the transparent panel displays the image applicable to the first eye at the first region, the image display method further includes step S40 which provides an eye tracker for tracking a relative displacement between the first eye and the transparent panel. In step S50, the display region of the superimposed image is selectively adjusted such that at least one eye sees the superimposed image superimposed on the surface region but the other eye only sees the surface region.

Step S50 further includes the following steps: when the relative displacement is larger than a first displacement threshold, the eye tracker transmits a moving signal to the transparent panel for switching the transparent panel to display the image applicable to the second eye at the first region, such that the second eye sees the superimposed image superimposed on the surface region but the first eye only sees the surface region.

Step S50 further includes the following steps: when the relative displacement is larger than a second displacement threshold, the eye tracker transmits a moving signal to the transparent panel for switching the transparent panel not to display the image applicable to the first eye at the first region but to display the image applicable to the first eye at the second region, such that the first eye sees the superimposed image superimposed on the surface region but the second eye only sees the surface region.

The method of the embodiments of the invention further includes placing a mark tracking device under the transparent panel for capturing a positioning point at a surface region and transmitting a positioning point image to the transparent panel. The transparent panel calculates a relative displacement between the superimposed image and the surface region according to the positioning point.

To summarize, the image display device and the image display method disclosed in the embodiments of the invention may directly superimpose the image displayed on the transparent panel and the image of a physical object. This is for resolving the parallax problem arising when human eyes view the superimposed image by removing the image display circuits from the display region or switching the display region. Further, the embodiments of the application may achieve vision depth to human eyes when viewing the superimposed image.

While the invention has been described by way of example and in terms of the embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image display device, comprising:
   a transparent panel for displaying a superimposed image corresponding to a surface region under the transparent panel at a first region of the transparent panel; and
   a display adjustment layer formed on the transparent panel for reserving a monocular vision to see the superimposed image; and
   a scanner for scanning the surface region such that the superimposed image is set corresponding to the surface region,
   wherein when a first eye and a second eye see the surface region through the image display device, the first eye sees the superimposed image superimposed on the surface region and the second eye only sees the surface region;
   the superimposed image is a scan image under a depth of the surface region, and
   the superimposed image is obtained by superimposing an image displayed on the transparent panel and an image of a physical object.

2. The image display device according to claim 1, wherein the display adjustment layer makes the first eye only see the first region of the transparent panel and the second eye only see a second region of the transparent panel, the transparent panel displays the superimposed image only at the first region, and the second eye only sees the surface region through the second region of the transparent panel.

3. The image display device according to claim 2, wherein the first region and the second region both comprise a plurality of long strip regions and the long strip regions of the first region are staggered with the long strip regions of the second region.

4. The image display device according to claim 2, wherein no image display circuits are formed in the second region of the transparent panel.

5. The image display device according to claim 2, wherein the superimposed image comprises a first image applicable to the first eye and a second image applicable to the second eye, the display panel displays the first image applicable to the first eye at the first region, and the image display device further comprises:
   an eye tracker formed above the transparent panel for tracking a relative displacement between the first eye and the transparent panel;
   wherein, when the relative displacement is larger than a first displacement threshold, the eye tracker transmits a moving signal to the transparent panel for switching the transparent panel to display the second image applicable to the second eye at the first region, such that the second eye sees the second image superimposed on the surface region and the first eye only sees the surface region.

6. The image display device according to claim 2, wherein the superimposed image comprises a first image applicable to the first eye and a second image applicable to the second eye, the transparent panel displays the first image applicable to the first eye at the first region, and the image display device further comprises:
   an eye tracker formed above the transparent panel for tracking a relative displacement between the first eye and the transparent panel;
   wherein, when the relative displacement is larger than a second displacement threshold, the eye tracker transmits a moving signal to the transparent panel for switching the transparent panel not to display the first image applicable to the first eye at the first region but to display the first image applicable to the first eye at the second region, such that the first eye sees the first image superimposed on the surface region but the second eye only sees the surface region.

7. The image display device according to claim 1, wherein the display adjustment layer is realized by either a cylindrical lens layer or a parallax shielding layer.

8. The image display device according to claim 1, further comprising:
   a mark tracking device under the transparent panel for capturing a positioning point at the surface region and for transmitting a positioning point image to the transparent panel,
   wherein the transparent panel calculates a relative displacement between the superimposed image and the surface region according to the image of the positioning point.

9. An image display method, comprising:
   providing a transparent panel above a surface region;
   displaying a superimposed image corresponding to the surface region at a first region of the transparent panel; and
   forming a display adjustment layer on the transparent panel for reserving a monocular vision to see the superimposed image,
   wherein when a first eye and a second eye see the surface region through the display adjustment layer and the transparent panel, the first eye sees the superimposed image superimposed on the surface region but the second eye only sees the surface region;
   the surface region is scanned by a scanner such that the superimposed image is set corresponding to the surface region;
   the superimposed image is a scan image under a depth of the surface region; and
   the superimposed image is obtained by superimposing an image displayed on the transparent panel and an image of a physical object.

10. The image display method according to claim 9, wherein the display adjustment layer makes the first eye only see the first region of the transparent panel and the second eye only see a second region of the transparent panel, the transparent panel displays the superimposed image only at the first region, and the second eye only sees the surface region through the second region of the transparent panel.

11. The image display method according to claim 10, wherein the first region and the second region both comprise a plurality of long strip regions and the long strip regions of the first region are staggered with the long strip regions of the second region.

12. The image display method according to claim 10, wherein no image display circuits are formed in the second region of the transparent panel.

13. The image display method according to claim 10, wherein the superimposed image comprises a first image applicable to the first eye and a second image applicable to the second eye, the transparent panel displays the first image applicable to the first eye at the first region, and the image display method further comprises:
    tracking a relative displacement between the first eye and the transparent panel by an eye tracker above the transparent panel;
    wherein, when the relative displacement is larger than a first displacement threshold, the eye tracker transmits a moving signal to the transparent panel for switching the transparent panel to display the second image applicable to the second eye at the first region, such that the second eye sees the second image superimposed on the surface region but the first eye only sees the surface region.

14. The image display method according to claim 10, wherein the superimposed image comprises a first image applicable to the first eye and a second image applicable to the second eye, the transparent panel displays the first image applicable to the first eye at the first region, and the image display device further comprises:
    an eye tracker formed above the transparent panel for tracking a relative displacement between the first eye and the transparent panel;
    wherein, when the relative displacement is larger than a second displacement threshold, the eye tracker transmits a moving signal to the transparent panel for switching the transparent panel not to display the first image applicable to the first eye at the first region but to display the first image applicable to the first eye at the second region, such that the first eye sees the first image superimposed on the surface region but the second eye only sees the surface region.

15. The image display method according to claim 9, wherein
    the display adjustment layer is realized by either a cylindrical lens layer or a parallax shielding layer.

16. The image display method according to claim 9, further comprising:
    capturing a positioning point at the surface region by a mark tracking device which is under the transparent panel, and transmitting a positioning point image to the transparent panel,
    wherein the transparent panel calculates a relative displacement between the superimposed image and the surface region according to the image of the positioning point.

\* \* \* \* \*